No. 722,840. PATENTED MAR. 17, 1903.
J. H. HAMMER.
MACHINE FOR PRICKING PRUNES OR LIKE FRUITS.
APPLICATION FILED NOV. 12, 1901.
NO MODEL. 2 SHEETS—SHEET 1.
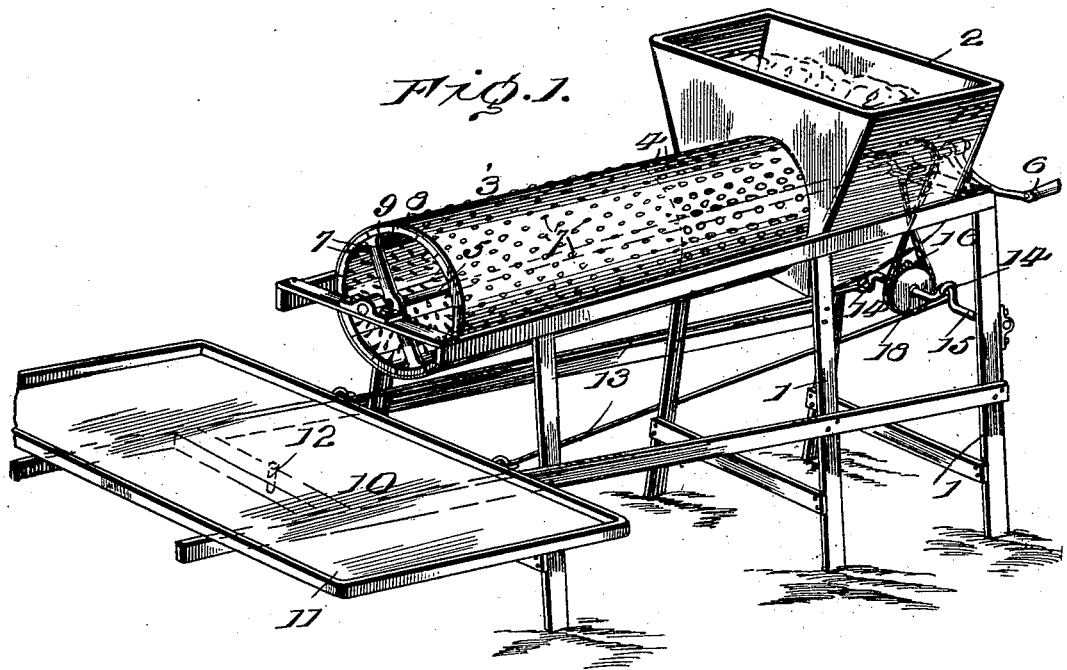
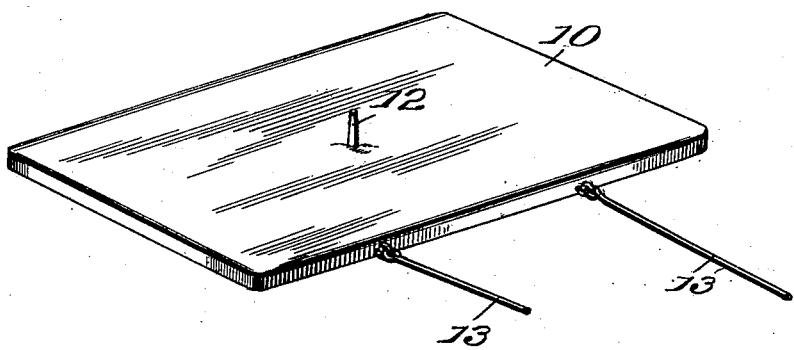
Inventor
J. H. Hammer.
Witnesses No. 722,840. PATENTED MAR. 17, 1903.
J. H. HAMMER.
MACHINE FOR PRICKING PRUNES OR LIKE FRUITS.
APPLICATION FILED NOV. 12, 1901.
NO MODEL. 2 SHEETS—SHEET 2.
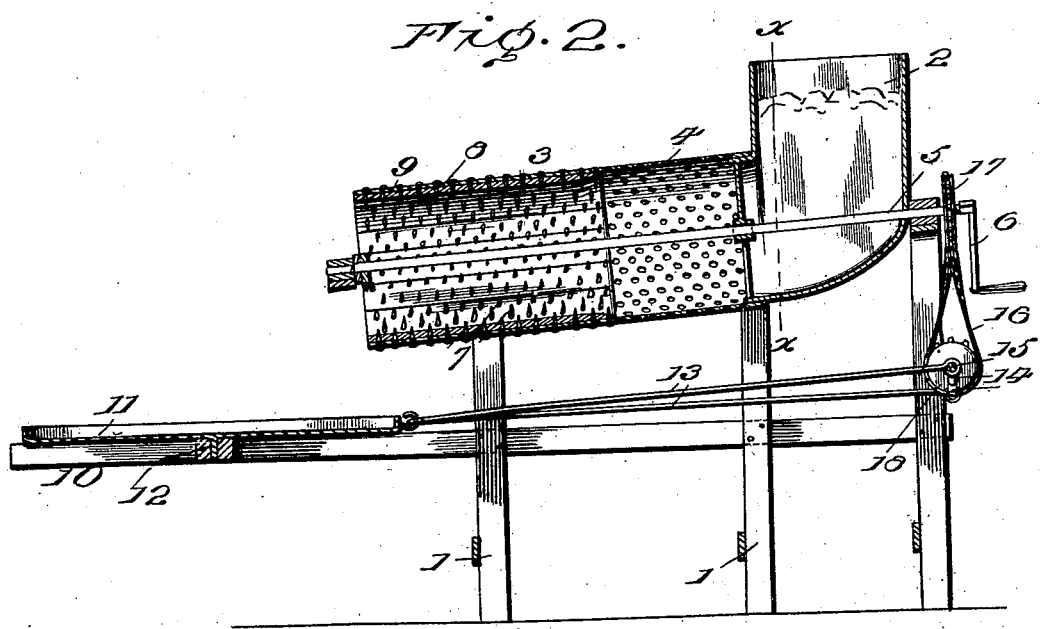
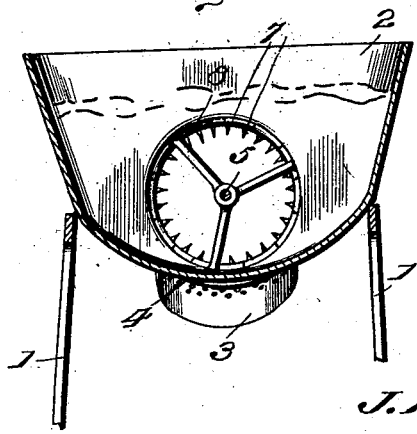
Inventor
J. H. Hammer.
Witnesses By Attorneys

UNITED STATES PATENT OFFICE.

JOHN H. HAMMER, OF MEDFORD, OREGON.

MACHINE FOR PRICKING PRUNES OR LIKE FRUITS.

SPECIFICATION forming part of Letters Patent No. 722,840, dated March 17, 1903.

Application filed November 12, 1901. Serial No. 82,053. (No model.)

*To all whom it may concern:*

Be it known that I, JOHN H. HAMMER, a citizen of the United States, residing at Medford, in the county of Jackson and State of Oregon, have invented certain new and useful Improvements in Machines for Pricking Prunes or Like Fruits; and I do hereby declare the following to be a full, clear, and exact description of the invention, such as will enable others skilled in the art to which it appertains to make and use the same.

Fruit cured by desiccation without being pared or cut and of which prunes are a type requires the skin to be broken, so as to provide an escape for the watery constituent in the form of vapor. This is usually effected by dipping the fruit in a caustic bath, which checks the skin and in a degree impairs the flavor and wholesomeness of the article.

This invention provides a machine which embodies in its organization a cleaner for removing leaves, dirt, and other foreign matter from the fruit, a pricking mechanism for piercing the skin with minute openings, and an agitator for spreading the fruit upon the trays, the several mechanisms constituting essential parts of a complete machine and acting successively on the fruit while in transit from the hopper to the tray without intermediate handling or transference from one machine to another.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a machine embodying the invention. Fig. 2 is a vertical central longitudinal section thereof. Fig. 3 is a transverse section on the line X X of Fig. 2 looking to the left. Fig. 4 is a detail perspective view of the shaking table or support for a tray. Fig. 5 is a detail view showing a portion of the cylinder provided with the lining and the spurs or points connecting the cylinder and lining and braced by the latter.

Corresponding and like parts are referred to in the following description and indicated in all the views of the drawings by the same reference characters.

The framework 1 may be of any construction best adapted for supporting the operating parts and comprises a series of longitudinal, transverse, and upright beams rigidly connected at their meeting or crossing points. A hopper 2 is located at one end of the machine for receiving the fruit in bulk, and this hopper is provided in one side with an opening for the discharge of the fruit. A pricking drum or cylinder 3 is located at the opposite end of the machine and is mounted for rotation about a longitudinal axis. A rotary screen or sieve 4 is arranged intermediate of the hopper and pricking-drum and is in longitudinal alinement with the latter and is designed to remove leaves, stems, and all foreign matter from the fruit prior to its entrance into the drum 3, which pierces the skin in a manner presently to be described. The rotary sieve or screen 4 is, in effect, an extension of the drum 3 and may be of any construction. The receiving end of the sieve fits close against the side of the hopper having the discharge-opening, so as to prevent any escape of fruit. The shaft 5, forming the axis of the drum and screen, passes centrally therethrough and is journaled at or near its ends in bearings provided at or near the ends of the supporting-framework. This shaft is rigidly connected with the drum and sieve to firmly support and compel rotation thereof with the said shaft. While it is contemplated to rotate the shaft by any suitable power, a crank-handle 6 is provided and attached to one end of the shaft. In order that the fruit may move automatically through the sieve and drum, the latter are arranged at an inclination, as shown most clearly in Fig. 2, the feed or movement of the fruit through the parts 3 and 4 being effected by gravitative action and the rotation of the drum and sieve.

The pricking cylinder or drum 3 is provided upon its inner side with a multiplicity of points or spurs 7 from one-fourth to one-half an inch in length and sharpened so as to readily penetrate the skin of the fruit, whereby the curing or desiccating process is hastened.

The pricking points or spurs 7 may be tacks or pins studding the interior of the drum and spaced apart any determinate distance, the manner of attaching the points to the drum being immaterial within the broad principle of the invention. In its specific construction the drum or cylinder comprises a metal shell 8 and a lining 9 of wooden strips, the shell and lining being secured together in any manner, preferably by means of the points or spurs 7, which are driven through openings in the shell 8 and through the lining 9. The shell 8 being of sheet metal and comparatively thin would not of itself afford proper support for the points 7. Hence the provision of the lining 9, in addition to stiffening and reinforcing the shell, provides ample support for the points and braces them against lateral stress.

A shaking table or support 10 is located at the discharge end of the machine and receives the tray 11, upon which the fruit, after being pierced, is delivered, the shaking movement of the table serving to spread the fruit and distribute it over the tray, which is subsequently placed in the drier for curing of the fruit. The table 10 is supported in any way so as to vibrate, and, as shown, it is provided with a pendent journal 12, fitted in a bearing applied to a part of the framework 1. The table 10 is vibrated by means of rods 13, having loose connection at one end with the table near opposite ends and having loose connection at the opposite end with crank portions 14 of a shaft 15, journaled transversely of the machine and connected by a drive-belt 16 with the shaft 5. As shown, the drive-belt 16 is of link construction and coöperates with sprocket-wheels 17 and 18, secured to the shafts 5 and 15, so as to rotate therewith.

In the practical operation of the machine the fruit to be treated is placed in bulk in the hopper 2 and passes therefrom into the sieve or screen 4, and upon rotating the sieve and drum the fruit is cleaned by removal of leaves, stems, and foreign matter by means of the screen and is subsequently pierced by its passage through the pricking-drum 3, the points or spurs 7 of which penetrate and pierce the skin. The fruit is discharged from the pricking-drum onto the tray 11 and distributed thereon by the vibratory action of the shaking table or support 10. When one tray is filled, it is instantly removed and replaced by another, so that there may be no interruption in the operation of the machine and no dropping of the fruit upon the floor or other surface upon which the machine may be placed.

Having thus described the invention, what is claimed as new is—

A machine for piercing the skin of fruit comprising a hopper, a drum arranged to receive the fruit from the hopper and inclined therefrom, the end portion of the drum adjacent to the hopper being perforated, a lining fitted to the remaining portion of the drum, spurs studding the interior of the drum and connecting the lining thereto and in turn braced by the said lining, a shaking-table supported upon a central journal, a shaft supporting the drum, a second shaft connected to revolve with the shaft of the drum and having opposite crank portions, and connections between said crank portions and opposite end portions of the shaking-table, substantially as described.

In testimony whereof I affix my signature in presence of two witnesses.

JOHN H. HAMMER. [L. S.]

Witnesses:
HENRY KLIPPEL,
M. PURDIN.